United States Patent
Wolff et al.

(10) Patent No.: US 11,386,472 B2
(45) Date of Patent: *Jul. 12, 2022

(54) SYSTEMS AND METHODS FOR A REAL TIME CONFIGURING, ORDERING AND MANUFACTURING OF COLOR RELATED PRODUCTS

(71) Applicant: HALO GOODS, LLC, Wilmington, DE (US)

(72) Inventors: Paul Wolff, Calabasis, CA (US); Sean Stephan, Calabasis, CA (US)

(73) Assignee: Paul Wolff, Calabasas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/914,274

(22) Filed: Jun. 27, 2020

(65) Prior Publication Data

US 2020/0394695 A1 Dec. 17, 2020

Related U.S. Application Data

(63) Continuation of application No. 15/620,293, filed on Jun. 12, 2017, now Pat. No. 10,706,449.

(Continued)

(51) Int. Cl.
*G06Q 30/00* (2012.01)
*G06Q 30/06* (2012.01)
(Continued)

(52) U.S. Cl.
CPC ......... *G06Q 30/0621* (2013.01); *A45D 29/00* (2013.01); *A45D 44/005* (2013.01);
(Continued)

(58) Field of Classification Search
None
See application file for complete search history.

(56) References Cited

U.S. PATENT DOCUMENTS 2,393,371 A 1/1946 Irene
5,903,465 A 5/1999 Brown
(Continued)

OTHER PUBLICATIONS

Pollard et al., "Strategies for Mass Customization" Journal of Business & Economics Research vol. 6, No. 7, pp. 77-86 (Year: 2008).

*Primary Examiner* — Naeem U Haq
(74) *Attorney, Agent, or Firm* — Mahesh Law Group PC

(57) ABSTRACT

A unique, user generated product (UGP) configurator, ordering and manufacturing system that utilizes a mobile device or other digital device, to capture a specific color or multiple colors, by way of an image capture converted from a RGB profile and converted into a manufacturable, mixable formula for future mixing and filling in the system specific processing line for enamel product is described. The user defined final product chosen by an individual user, through the system's user interface that runs on all web enabled digital devices which includes mobile, tablet, computer or other color capture user interface connected to the Internet by way of a browser, where the individual identifies a color, type of material to be manufactured, size of container and then orders a finished goods product on their phone or other digital device, then manufactured or processed on a system specific equipment platform, using a computer controlled system that identifies an individual order by way of a variable and unique bar code identifier, where containers move down a proprietary conveyor line to be filled by a series of individually powered, micro-droplet dispensers whose canisters have been filled with specific colored paints from a system defined palette of colors and additives, where those individual paints are mixed to match the color that the individual specified on the system specific user interface.

19 Claims, 8 Drawing Sheets

Related U.S. Application Data

(60) Provisional application No. 62/349,604, filed on Jun. 13, 2016.

(51) Int. Cl.
*G06Q 50/04* (2012.01)
*A45D 29/00* (2006.01)
*G06Q 10/08* (2012.01)
*A45D 44/00* (2006.01)

(52) U.S. Cl.
CPC ........... *G06Q 10/08* (2013.01); *G06Q 10/087* (2013.01); *G06Q 30/0637* (2013.01); *G06Q 30/0641* (2013.01); *G06Q 50/04* (2013.01)

(56) References Cited

U.S. PATENT DOCUMENTS

| | | |
|---|---|---|
| 5,960,411 A | 9/1999 | Hartman et al. |
| 6,177,093 B1 | 1/2001 | Lombardi et al. |
| 6,516,245 B1 | 2/2003 | Dirksing |
| 6,622,064 B2 | 9/2003 | Bartholomew et al. |
| 7,099,740 B2 | 8/2006 | Bartholomew et al. |
| 7,477,780 B2 | 1/2009 | Boncyk et al. |
| 7,571,122 B2 | 8/2009 | Howes |
| 8,880,218 B2 | 11/2014 | Bartholomew et al. |
| 9,222,836 B2 | 12/2015 | Conti et al. |
| 9,395,292 B2 | 7/2016 | Wei et al. |
| 9,498,974 B2 | 11/2016 | Choi |
| 2002/0036696 A1 | 3/2002 | Takemoto |
| 2003/0043414 A1* | 3/2003 | Brady ............... H04N 1/40075 358/3.06 |
| 2004/0243361 A1 | 12/2004 | Steuben et al. |
| 2007/0242877 A1* | 10/2007 | Peters ...................... G01J 3/46 382/167 |
| 2009/0169117 A1 | 7/2009 | Baba et al. |
| 2012/0170840 A1 | 7/2012 | Caruso et al. |
| 2012/0262571 A1 | 10/2012 | Wang et al. |
| 2017/0206678 A1* | 7/2017 | Kowalczyk .......... G06V 10/758 |
| 2018/0126342 A1 | 5/2018 | Kent |

\* cited by examiner

SYSTEMS AND METHODS FOR A REAL TIME CONFIGURING, ORDERING AND MANUFACTURING OF COLOR RELATED PRODUCTS

CROSS REFERENCES TO RELATED APPLICATIONS

This application is a continuation of Non-Provisional application Ser. No. 15/620,293, filed Jun. 12, 2017, entitled as "Systems and Methods for a Real Time Configuring, Ordering and Manufacturing of Color Related Products", which claimed the benefit of U.S. Provisional Patent Application No. 62/349,604, filed Jun. 13, 2016, entitled as "Systems and Methods for a Real Time Configuring, Ordering and Manufacturing of Nail Polish Related Products", which is incorporated herein by reference in its entirety.

FIELD

The present disclosure generally relates to a high volume, micro batch, rapid prototyping, customized production system that uses digital devices to specify component parts of a finished product, in this case nail enamel products.

BACKGROUND

The industrial revolution of the 19th century brought about mass production: a method of manufacturing standardized products that was faster and more efficient than making them by hand. "You can have any color you want, as long as it's black." (Henry Ford, Ford Motor Company, circa 1908) was the level of customization available through that manufacturing process. The 21th century has seen a new revolution—the Customer Revolution—that has created a consumer thirst for customized products with the desired result being mass customization. The Customer's or user's desire for personalized user generated products, in this instance nail polish colors manufactured to their specification, is an important topic of current research.

There are approximately 150 million bottles of nail polish sold every year in the US. Those sales represent individual bottles that are filled in mass with the same color. These colors have been prior defined by a creative designer or company associate, with those colors integrated into groups or lines of product that are marketed in retail and professional locations. These pre-defined colors have been formulated and manufactured in large volume batches; manufactured in large mixing vats of single colors of nail polish, coatings or other paint. These large batches of single colors are then filled into individual pre-labeled bottles in factories using traditional volume manufacturing equipment, systems and techniques.

Other patents have described automated nail polish dispensers. For example, U.S. Pat. No. 6,622,064 issued to Julie R Bartholomew, describes about user interactive custom nail polish color and effects dispensing system and method of doing business, including for both point of sale and remote transactions. U.S. Pat. No. 2,393,371 issued to Harris Irene describes about Display device for use in determining the shade of fingernail polish. U.S. Pat. No. 6,516,245 issued to Robert S Dirksing et al. describes about a method for providing personalized cosmetics. None of the prior art described above point to a system, which can customize the color of the end product based on an image capture.

Hence there is a need for a system which allows a customer to choose a localized color using their device by way of image capture (cell phone, tablet or computer that has an image capture capability), approve that color on their device screen, order one or more bottles of nail polish by way process to transact business on the Internet, and have that product custom manufactured to their specification and shipped to their location.

SUMMARY

In an embodiment of the disclosure, a high-speed manufacturing system for the physical manufacture of custom colored nail polish integrated into a user generated, product configurator and transactional software platform is described. Users initiate the system by way of their mobile, tablet or computer device (requires image capture), and by way of the Internet send their customized product order to a database, which takes that customer supplied information, converts it into a unique product order and sends it off to other computer systems for that order to be placed into an production cue, awaiting the physical manufacture of that individual unit of custom (colored to customer generated specification), proprietary formulated nail polish.

In another embodiment of the disclosure, a process and system that uses digital information and rapid prototyping processes, for an individual or group made to order on-demand, personalized, custom nail polish, coating or paint, in single or multiple units is described. Where the individual color is defined by capturing that specific and individual color through a scanning or image capture process using a mobile or other color image capture device or to choose that color from an online database of individual colors, and where that individual color is micro-batch produced, made to order, manufactured and filled at a high speed, using a proprietary micro droplet color deployment system and then filled into a single bottle or multiple bottles with colors specified by that individual on their mobile device or online, which can include a custom label with custom information or naming language, printed and affixed on that particular bottle(s) as part of the system conveyor line, which further identifies the color or other personal/promotional information that was inputted by an individual or group of individuals using the systems digital user interface is unique.

One aspect of the disclosure is the digital user interface or application that resides on a digital device (mobile, tablet, computer, laptop or web-enabled camera) and uses and/or initiates the a) camera function of the mobile, tablet, computer or other digital or camera device or b) image library function of the mobile, tablet, computer or other digital or camera device or storage device which would include flash or other type of hard drive storage device to input an image or video into the user interface application.

Another aspect of the disclosure is the ability to input a still or video image into the user interface and permit the user to pick a color at the pixel level which will become part of the color specification for later production.

Another aspect of the disclosure is the transfer of color data, chosen and specified by the user to be converted into a mixable formula to produce a specified, micro batch manufactured and filled finished product.

Another aspect of the disclosure is the ability to customize a name for the unique user generated and designed product. As part of the user interface is a unique visual capability to type the name, language or other symbol on a representation of the product, using a keyboard which is a component part of the digital user interface.

Yet another aspect of the disclosure is to identify each individual final product as unique with a variable barcode or other symbol identifier that is produced at the time of order through the user interface, where that identifier is included as part of that order, is printed on the label as part of the equipment platform and is the identifier that is used as a control/manufacturing key that "tells" the equipment which formula to pull from the manufacturing server for the accurate micro-droplet dispersion of paint for an accurate finished product result.

A further aspect of the disclosure is a cloud server that accepts the unique color data info distributed from the user interface application and converts that color data into a highly accurate manufacturable formula which is then distribute to the active order server to be used for quick turn manufacturing.

Another connected aspect of the disclosure is a system specifically designed and engineered manufacturing platform for producing the customer desired final product in all perfection.

It should be understood that the summary above is provided to introduce in simplified form a selection of examples that are further described in the detailed description. It is not meant to identify key or essential features of any claimed subject matter that may later claim priority to the present description. Furthermore, the scope of any such claimed subject matter would not be limited to implementations that solve any disadvantages noted above or contained herein.

DETAILED DESCRIPTION OF DISCLOSURE

Figure 1:
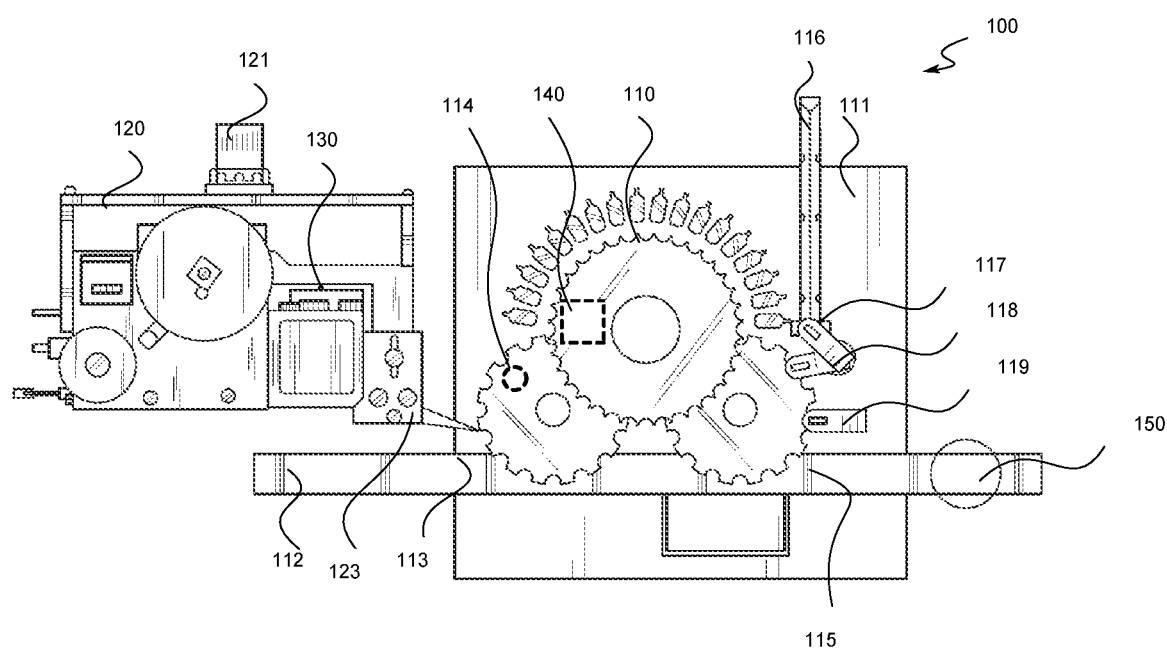
FIG. 1 illustrates an overview of a manufacturing system.

Before turning to the figures, which illustrate the exemplary embodiments in detail, it should be understood that the application is not limited to the details or methodology set forth in the description or illustrated in the figures. It should also be understood that the terminology is for the purpose of description only and should not be regarded as limiting.

Referring generally to the figures, embodiments of the systems and methods described herein are directed to manufacturing of color related products. Implementations are directed to a user generated, a color product configurator and a transactional software platform for manufacturing the color product. Implementations are directed to techniques that would allow an electronic device to deliver a user's order with user specifications to a manufacturing platform in real time, while simultaneously acknowledging and updating order details to the user. Embodiments are directed towards providing a real time configuring, ordering and manufacturing of color related products based on user provided images, portions of images, pixels and etc.

Embodiments of the present disclosure includes a customized, unique, user generated color product (UGCP) configurator, ordering and manufacturing system that may utilize a mobile device or other digital device, to capture a specific color or multiple colors, by way of an image capture converted from a Red Blue Green (RGB) profile and convert it into a manufacturable, mixable formula for mixing and filling in the system specific manufacturing process. The user defined final product may be chosen by a user through the system's user interface. The system's user interface may be implemented on any web enabled digital devices, including but not limited to mobile, tablet, computer or other color capture user interface connected to the Internet by way of a browser. The user identifies a color, type of material to be manufactured, size of container and then orders a finished goods product on their phone or other digital device, then manufactured or processed on a system specific equipment platform, using a computer controlled system that identifies an individual order by way of a variable and unique bar code identifier, where containers are moved on a conveyor line to be filled by a series of individually powered, micro-droplet dispensers whose canisters have been pre-filled with specific colored paints from a system defined palette of colors and additives (as opposed to pigments or colorants), where those individual paints are mixed to match the color that the user specified on the system specific user interface.

The system has a digital user interface or application that may be launched on any mobile device through two mobile operating environments or through the Internet. The purpose of the interface is to capture or input an image, pick a particular color within that image which the user would like to have a nail polish, paint or coating, cosmetic or color specific product manufactured in a customized fashion just for them, for the user to initiate and complete the order for that product. Cloud or premise based servers may be configured to receive color and order data from the digital user interface and convert color data to a manufacturable formula and to connect order information, including financial information to a third party transactional processor for order acceptance or denial and to archive that approved order on system servers connected to equipment platforms and customer associated data bases.

As described, the system comprises several components arranged in a various configuration to maximize efficiency of communication between the components. The system is designed to be scalable according to the needs and operational capacity of the particular manufacturing facility. The system includes a web-based user generated color product (UGCP) application, which is accessible through a variety of computing devices, including but not limited to such as desktop computers equipped with a web browser, as well through native mobile applications installed on mobile computing devices such as smartphones and tablets. A cloud-based infrastructure comprising a server and UGCP database configured to receive information from user and user devices via the Internet by way of cellular networks, wired and wireless routers, and local area networks (LANs) of varying size and configuration.

As described, the various implementations interact using various digital communication techniques. The wireless location beacons communicate with properly equipped mobile devices by way of Bluetooth Low Energy (BLE) radio transmitters. Mobile devices such as smartphones, notepads, and tablets, communicate with the cloud-based infrastructure by way of cellular signals and/or wireless local area networks (WLANs). The cloud-based infrastructure, likewise, sends and receives information to and from user and user devices via the internet by way of cellular networks, wired and wireless routers, local area networks (LANs) and WANs of varying size and configuration.

As described herein, how well the various elements comprising the system communicate with other elements depends entirely on such factors as available battery power, consistent and quality access to the internet via cellular networks, LANs, and WANs, and the reliability of cloud-infrastructure components and other mobile and stationary computing devices, and the dependability of web-based and native mobile applications. For instance, BLE location beacons, though conservative in terms of power consumption, are commonly powered using "button" batteries which must be tested and changed periodically. Mobile devices such as smartphones and tablets, particularly those belonging to patients, require steady access to cellular data networks. If for whatever reason a particular mobile device does not function properly or is otherwise disconnected from the cellular network, the device will be unable to communicate with the cloud-based infrastructure. Mobile device operability also largely depends on available battery power, as these devices must be recharged from time to time. Stationary computing devices, such as desktop computers and laptops, depend on steady access to LANs and WLANs as a means of accessing and the Internet and communicating with the cloud-based computing infrastructure. System crashes are also possible, potentially affecting communication between the server, database, and web-based and mobile applications, as all software applications are prone to malfunction.

As described, the components of the present invention interact with one another using primarily wireless technology. Examples of such technology utilized by the present invention include: Bluetooth Low Energy (BLE) wireless location beacons and medical devices. Utilize short-wavelength UHF radio waves in the ISM band from 2.4 to 2.485 GHz. Range is power dependent and customizable, but typical max range is around 100 meters. Wi-Fi transmitters/receivers installed in mobile devices, other wireless-capable computing devices, and wireless routers. Mainly utilize the 2.4 gigahertz (12 cm) UHF and 5 gigahertz (6 cm) SHF ISM radio bands. Range is typically around 100 meters, but depends on the frequency band, radio power output, antenna gain and antenna type as well as the modulation technique. Line-of-sight is the thumbnail guide but reflection and refraction can have a significant impact, especially indoors.

Mobile Internet connection utilizing a cellular service provider subscription. Utilize frequencies in the UHF radio frequency band allocated to mobile usage. Range is power dependent and depends largely on the availability of the subscriber network, device proximity to network nodes, e.g. cell towers, and the particular make and model of the device.

The significance of implementing the present invention within the color products industry, therefore, cannot be understated. In order to accommodate ever-increasing color product demands, the color product industry is left with little choice but to increase their traditional manufacturing and customer delivery process with little room for customization, both of which involve considerable investments in terms of time and money. On the other hand, the present invention provides custom manufacturing process to accommodate user specifications for color selection by a time and cost effective process A cheaper and more versatile method of indoor navigation has recently emerged taking advantage of 2.4 GHz Bluetooth Low Energy (BLE) beacon technology. BLE transmissions require relatively little power, and BLE beacons can survive on a typical watch battery for over a year. Additionally, most all modern smartphones come equipped with an accelerometer, which is a tiny sensor that is able to detect changes in velocity as well as spatial orientation. Considering the near ubiquity of smartphones, and how nearly all new models of smartphone come equipped with BLE-compatible radio chips and accelerometers, it makes sense that these technologies have already been leveraged to create more accurate, and, therefore, more versatile, indoor navigation systems.

As described, the present invention differs from present technology, not in terms of the individual components comprising it, but in terms of the way these various components interact as an integrated whole as means of providing a more satisfying and streamlined user experience, all the while automating many traditionally manual ordering processes and collecting and storing valuable information which can then be queried and analyzed for the purpose of identifying operational inefficiencies.

Referring to FIG. 1, a manufacturing system 100 involved in high-speed manufacturing system for the physical manufacture of custom colored products is described. Colored products may include, but not limited to, nail polish, paints, enamels, particles for printing, car paint, LaserJet printer ink materials, dyes used for coloring fabrics and cosmetics with various shades of color. The manufacturing system 100 includes a cascading module subsystem 110, a thermal printer subsystem 120, a color product identifier subsystem 130, and a pumping subsystem 140 and a color product verification subsystem 150.

A cascading module subsystem 110, connected to an equipment control platform 111 that moves individual bottles or packaging containers to specific locations on the conveyor unit 112 for the individual dispensing of product colors as incremental parts of the overall user color product formula. The conveyor unit 112 moves a bottle or other type of packaging container through the equipment control platform 111 from beginning to end.

At an auto feeding staging input unit 113 of the conveyor unit 112, a volume bottle or other packaging container for containing the dispensed user color product, is infeed into the cascading module subsystem. An automated stainless steel ball feeder 114 to introduce balls to maintain the separation between a bearing races (not shown in FIG. 1). This automatic ball feeder is a simple and dependable device used to dispense one ball into the equipment control platform 111, on a given command. The balls can be stored in a stainless-steel hopper (not shown in FIG. 1) and are fed down through a hollow shaft to a cam operated escapement where the balls are transferred to a discharge tube. The unit has been designed as a building block for automatic ball dispensing for cascading module subsystem 110, but may also be bench mounted as a single station feeder. A four-way pneumatic valve is required for operation for directional control. By providing four distinct flow paths, these valves make it easy to reverse the motion of a cylinder or motor used in the operation.

At an auto feeding staging output unit 115 of the conveyor unit 112, a cap feed track 116, a cap nest 117, a cap pick and place 118, and a cap tightening area 119 help in securing the bottle or packing container with a cap or lid after the filling of the user color product in the bottle or packing container.

The thermal printer subsystem 120, connected to an order server 121 prints a user color product naming, generated by a UGCP web based application user interface, a unique order driven barcode or identity 122 (not shown in FIG. 1), which represents a user's unique color product. The unique bar code or identity prompts the initiation of dispensing of an order specific formula that matches a color of the user color product of a user's original specification. A thermal printer that prints unique order specific information on a product label including a custom name or symbol of the user's color product and a unique barcode or identity used to identify the requirements of a unique bottle or other type of packaging container. A label applicator 123 affixes a label to a bottle or other type of packaging container, a barcode reader 124 (not shown in FIG. 1) scans, images captures or reads the unique barcode printed on a unique bottle or other type of package container used to identify the requirements of a unique bottle or other type of package. The information regarding each and every order including user information, user color product specification information is stored in the order server 120 for further use. The order server 120, a web based server mediates the transaction between a user and manufacturing system 100.

A color product identifier subsystem 130, including bar code reader or scanner 131 (not shown in FIG. 1) is installed and integrated on the conveyor unit 112, which can scan and capture an image of a color product identifier. The color product identifier includes but not limited to a 1-dimensional or 2-dimensional barcode or identifiable symbol used to identify the unique formula properties of an individual bottle or other type of packaging container in accordance with user specifications. A unique formula to be dispensed into an individual bottle is acquired by the equipment control platform 111 and as that unique bottle with order specific naming/symbols/barcode travels through the conveyor unit 112 an into the cascading module subsystem, a calculated amount of appropriate color material(s) is dispensed into the individual bottle or other type of packaging container. The information regarding each and every order including user information, user color product specification information is stored in the order server 120 for further use by the color product identifier subsystem 130. The order server 121, a web based server mediates the transaction between a user and manufacturing system 100 through the color product identifier subsystem 130. The barcode reader (or barcode scanner) 131 is an electronic device that can read and output printed barcodes to a computer or a web based server 120. It includes a light source, a lens and a light sensor (laser or holographic) translating optical impulses into electrical ones. Additionally, barcode readers 131 includes a decoder circuitry analyzing the barcode's image data provided by the sensor and sending the barcode's content to the order server 121 through an output port.

A pumping subsystem 140, includes an automatic color material dispenser 141 (not shown in FIG. 1), controls the amount of color material dispensed into the individual bottle or other type of packaging container and is integrated into the cascading module subsystem 110. The functioning of the automatic color material dispenser 141 is controlled by the order server 121. The conveyor unit 112 moves the bottles to be filled with user color product to the pumping subsystem, which coordinates with color product identifier subsystem 130 and the order server 121 to confirm the appropriate color product to dispense based on user color product specification. This system located above the cascading module subsystem for the linear movement of individual bottles, work together to ensure that, the correct color material and correct amount of color material is dispensed in the correct bottle at high speed to support the volume requirements of the overall manufacturing and fill system.

A color product verification subsystem 150, includes an image capture device 151 (not shown in FIG. 1), connected to the order server analyzing three or more different color data sources, the original color data generated by the user on their mobile, table, computer or other device, the color data from the formula generated from the system, and color data of the wet sample that has been dispensed into a bottle or other type of package. The image capture device 151 includes but not limited to a camera, a sensor, which can compare color variations of finished user color product. The wet finished user color product data is adjusted to take into consideration the wet state of the user color product as opposed to dry or cured. The three sample sets of color data are compared against each other and using system specific math that uses a system specific variance formula to either approve the finished product or reject the finished user color product. Methods for color comparison may include but not limited to Polar Comparison, Percentage comparison, a linear regression and standard error of regression comparison.

Figure 2:
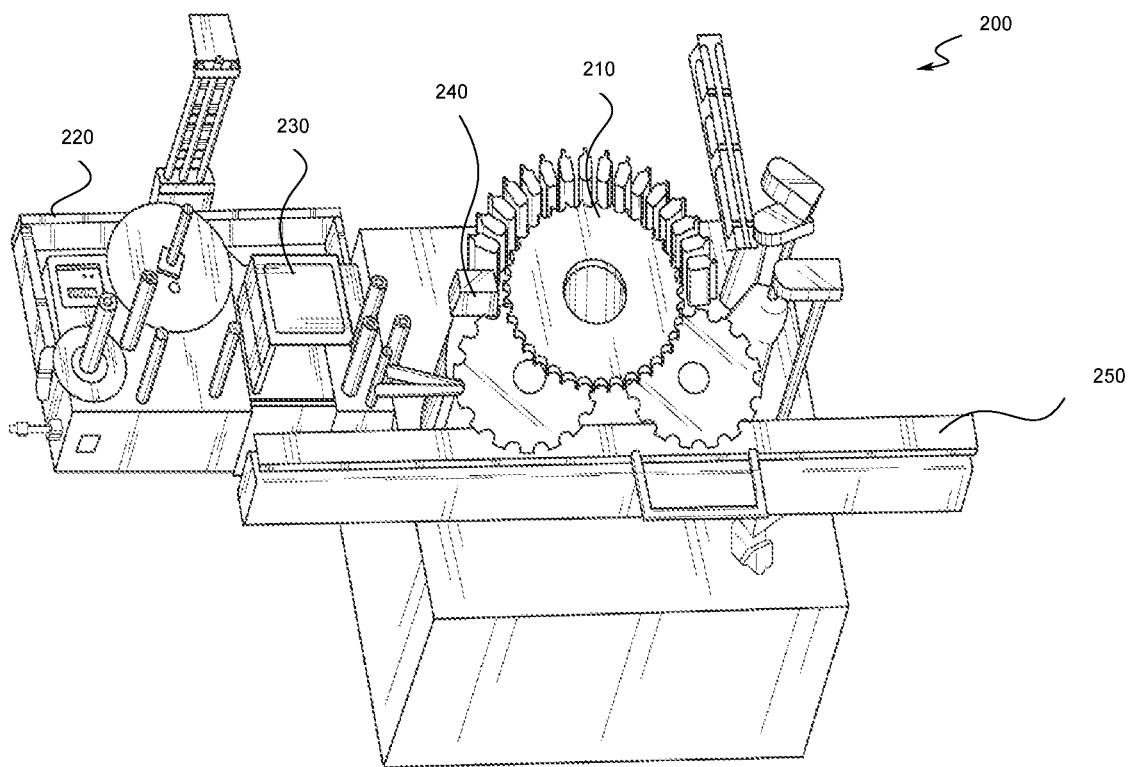
FIG. 2 illustrates a perspective view of the manufacturing system.

Referring to FIG. 2, FIG. 2 illustrates an exemplary system embodiment 200 of a manufacturing system 100 involved in high-speed manufacturing system for the physical manufacture of custom colored products is described. The dimension features of the example manufacturing system 200, which is portable and less space consuming, are described as follows. The exemplary embodiment 200 includes an example cascading module subsystem 210, example thermal printer subsystem 220, an example color product identifier subsystem 230, and an example pumping subsystem 240 and an example product verification subsystem 250. The example cascading module subsystem 210 has dimensions of length, breadth and height ranging between 40-45 inches, 35-45 inches and 8-12 inches. The example thermal printer subsystem 220 has dimensions of length, breadth and height ranging between 40-45 inches, 35-45 inches and 8-12 inches. The example color product identifier subsystem 230 has dimensions of length, breadth and height ranging between 40-45 inches, 35-45 inches and 8-12 inches. The example pumping subsystem 240 has dimensions of length, breadth and height ranging between 40-45 inches, 35-45 inches and 8-12 inches. The example product verification subsystem 250 has dimensions of length, breadth and height ranging between 70-45 inches, 35-45 inches and 8-12 inches. The example manufacturing system 200 can be installed in any convenient facility which may include but not limited, stores and vendor locations.

Figure 3:
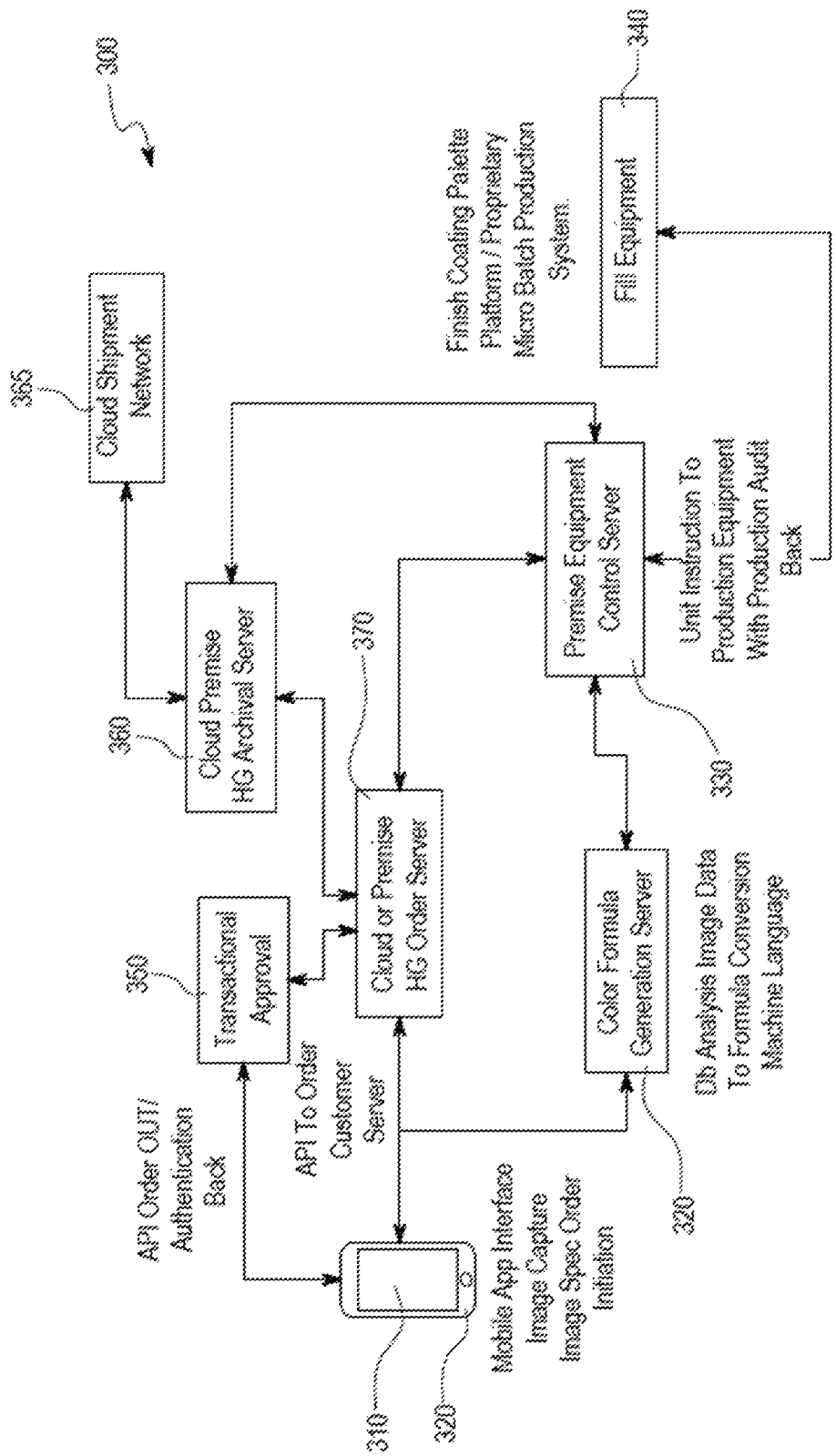
FIG. 3 illustrates a block diagram that may be implemented by the system shown in FIG. 1.

Referring to FIG. 3, FIG. 3 illustrates an example flow diagram 300 for the system involved in high-speed manufacturing system for the physical manufacture of one or more custom colored products. The flow diagram 300 includes the components, a web based user generated color product (UGCP) application 310, a color formula generation server 320, a premise equipment control server 330, automated equipment platform 340, transactional server 350, archival server 360 and central cloud or premise order server 370.

A web based user generated color product (UGCP) application 310 that has been downloaded onto a mobile device 320. In other embodiments, the UGCP application 310 can be downloaded on a tablet device, computer or system user interface that can be connected to directly on the web. The application or user interface is an interactive specification and ordering system for the user generated customization of a color product, including but not limited to nail polish, paints, coatings, cosmetics or other products, where color is a key specification element of the finished product. The application can be used to register and create a personal or business account, post images on social media sites, as well as to capture an image with the camera feature, stretch or zoom in on that image to specify a color on a pixel by pixel basis, accept that color as the color of specified choice or return to the image capture or color selection screen to redo that specification process, create a name for that unique user generated and customized product, order that product as well as other product of the cart feature included in the digital segment of the system and invention, as well as receive text messages, view video as both marketing and order specific status information on the unique and specific order. The user on the application and web user interface or site, can also receive points for purchases to be used later for loyalty driven gifts or rewards, use promo codes to receive discounts or reward other entities for the purpose of socially impactful revenue share and included in the application is the ability to gamify all aspects of the transaction and user interface experience. This represents elements of the application, but does not represent every type of user or system benefit.

A color formula generation server 320 that includes a database structure designed specifically to accept unique color data from a user defined color choice, generated on the system mobile application or web interface that has been downloaded to a mobile, tablet or other device that can capture an image, or through the web interface on a mobile, tablet, computer or other interactive device connected to the internet through a browser that can also capture an image. The color data is received by the system specific cloud or premise based server, which has been designed and developed to convert digital color data received and convert that data in a manufactural formula that utilizes a system specific palette of colors. The formula system has been developed to be able to analyze color data and generate formulas for all 16.7 million digital colors noted in the color spectrum. The system is not limited to those 16.7 million digital colors noted in the color spectrum and has the ability to add other types of paint, coating, nail polish or other effects and materials and create additive formula results that are integrated into the system creating another 100+ million color finish options.

The system includes a server premise equipment control server 330 that is connected to both the equipment platform and other system servers in a network, where formula data is converted to machine language to interact with system equipment be able to identify unique bottle and/or other packaging, by reading unique bottle and other packaging and order barcodes and move that bottle and/or other unique packaging by way of infeed and outbound conveyors through the manufacturing and fill platform dispensing specific and unique order and single bottle and/or other packaging color materials, color by color to complete a singular or multiple task-set.

The system includes an automated equipment platform 340 that includes the following component parts; a conveyor unit that takes a bottle or other type of packaging container through the equipment system from beginning to end, an infeed conveyor that includes a volume bottle or other packaging auto feed staging unit, an automated stainless steel ball feeder, a thermal printer that prints unique order specific information on a product label including the custom name or symbol of the product and a unique variable barcode used to identify the requirements of a unique bottle or other type of packaging, a label applicator that affixes a label to a bottle or other type of packaging, a barcode reader that scans, image captures or reads the unique barcode printed on a unique bottle or other type of package used to identify the requirements of a unique bottle or other type of package, a cascading linear pump system that dispenses color material into a unique bottle or other type of packaging based on the product specific formulas and instruction controlled by a series of connected servers, a camera or image capture device that captures color data from the finished product that has been dispensed into a unique bottle or other type of packaging, connected to a server for the specific quality analysis of a finished product, a device that installs a cap, lid or other closure element, a device that shakes the finished product to ensure that the various color materials have been combined to a specified finished product state, an out-feed conveyor system that moves finished bottles or other types of packaging in various directions based on size of order, acceptance of quality of an individual finished bottle or other type of packaging, or the creation of separation to ensure that line associates can easily pick and place bottles or other types of packaging for shipping, a ship label printer that matches the shipping label to the product associated with that label for optimized coordination of products prior to shipment.

The system is connected to a transactional server 350, which processes transactional data such as the number of units, price per unit, shipping and billing information and credit card information used to an order is processed for approval and archival storage of certain types of information. If an order is approved or not approved, that transactional answer is noted by the system and the order is moved forward into the systems active order server and then into an order cue.

The system also includes an archival server 360 to store individual user information, user color product specification, finished order information, formula information and other user specific information in a user order(s) hierarchy. The archival server assists in prompting the user of previous orders and order specifications pertaining to color products. The archival server is connected to a cloud shipment network 365 for fulfilling and delivering shipment orders to user locations.

The system also includes a central cloud or premise order Server 370. This server is connected the web based user generated color product (UGCP) application 310, a color formula generation server 320, a premise equipment control server 330, the automated equipment platform 340, the transactional server 350, the archival server 360 and moves required information back and forth to keep order information current and accurate according to the user color product specifications.

Figure 4A:
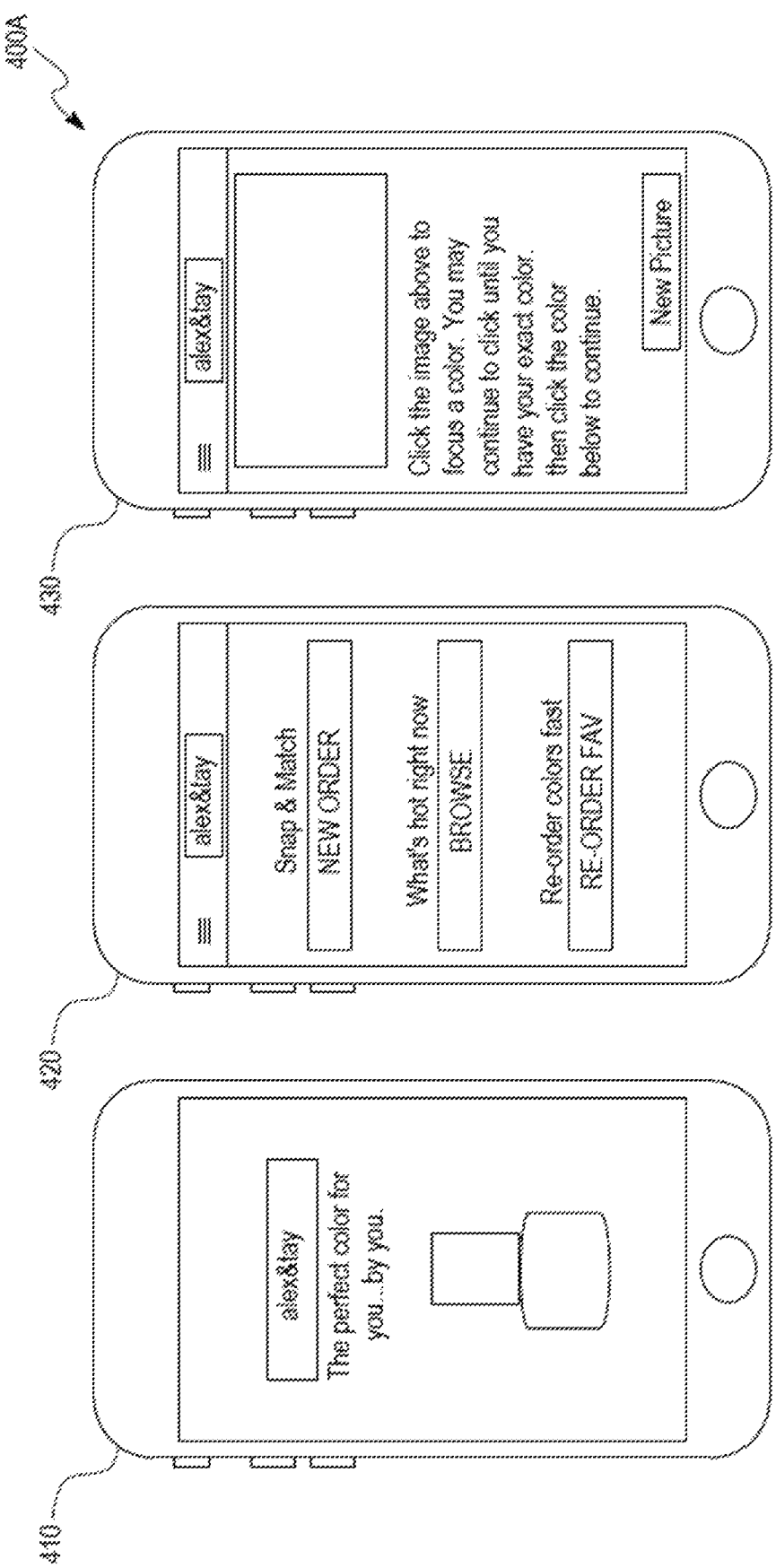
FIG. 4A illustrates screen shots of various stages of the user application.
Figure 4B:
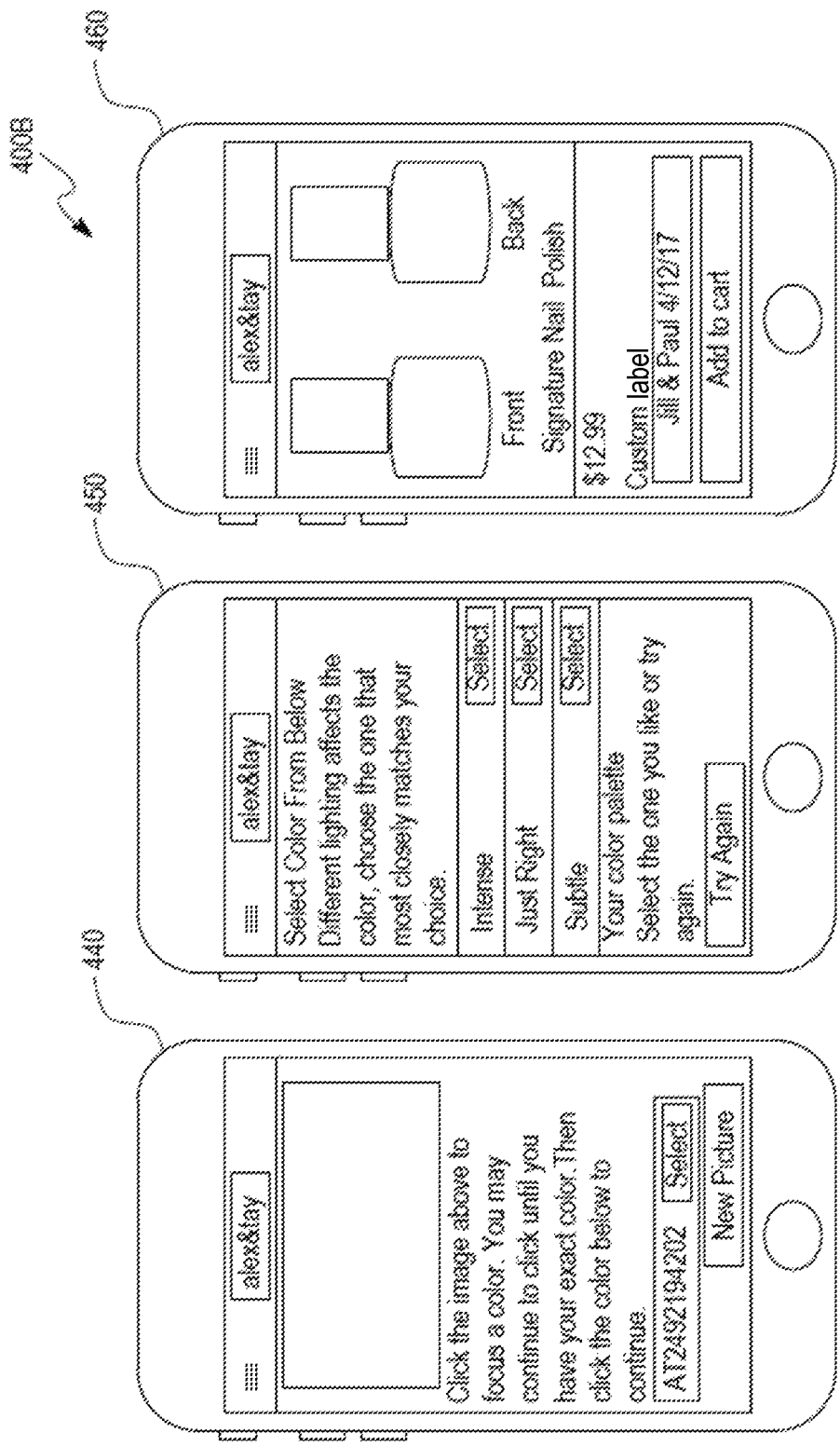
FIG. 4B illustrates screen shots of various stages of the user application.

Referring to FIGS. 4A and 4B, FIGS. 4A and 4B illustrates a mobile and web application system 400A and 400B respectively for user generated color product (UGCP) application, including various screen sets or a user interfaces to take a user through the activities associated with the user segment of the process for manufacturing user customized color products. The main six image screens to in the user interface process flow include, but not limited to, an open application image screen 410, an activities image screen which includes a new order choice, a trend choice and a previous order choice 420, take a picture image screen 430, user chosen color image screen 440, confirm user color image screen 450 and custom name and order a user color product image screen 460. Based upon the choice selected by the user, a defined path exists to take the user from initiation to completion of the ordering process based upon the path chosen by the user.

At image screen 410, an open application image screen, the UGCP application is opened on a user's electronic device, which displays the message "The perfect color for by you" prompting the user to select a color for their color product order. At this stage, the central cloud or premise order Server 370 keeps track of that a new order is being initiated and sets its server to take the user through the different steps of the process of ordering a color product.

At image screen 420, an activities image screen, the user is given option for making a new order by snap and match procedure or by browsing through a list of color product orders from others and to choose a particular color from them or to quickly reorder a previously ordered color product from the user. At this stage, the central cloud or premise order Server 370 keeps a count of previous orders by the same user and provides options based on the user's interest scope.

Also, included in the screen set is the take a picture image screen 430, which opens the camera tool included in all supported electronic devices, the ability to take a picture or open a picture from a user defined image library or an ability to pull an image from a video clip. At this stage, the central cloud or premise order Server 370 saves the newly taken image by the user to user specific image library with a unique image code for future retrieval.

Once a user decides upon an image of interest to be used having the user desired color, a user chosen color image screen 440 is opened where, the user can enlarge the image or move or manipulate the image with their finger, a pencil, a stylus or other device or element that can interface successfully with a touch screen, to pick a color until a user desired color is available for selecting. At this stage, the central cloud or premise order Server 370 records the unique color selected by the user and saves it in user specific database.

At confirm user color image screen 450 the user gets an opportunity to confirm the color of choice with more detailed definition including but not limited to an intense, just right or subtle shades of the selected color. The color chosen is a made up of a single pixel that is converted into a side to side color swatch, giving the user a scaled method in which to choose and approve a color. The following screen is a confirmation screen, where 2 or more swatches are presented that give the user adjusted color choices, this has been done based upon different camera tool capture quality capabilities, ambient light at the time of image capture and other elements that might affect the quality of the image capture. At this stage, the central cloud or premise order Server 370 records the unique color in its Red Green Blue (RGB) Format, which would be necessary for converting to a digital color data for manufacturing the required color product.

Once the user confirms the target and specified color, custom name and order a user color product image screen 460 is opened and the user can customize the name of the product using an interactive typing keyboard where the letters are typed on a digital product packaging image. Upon completion and approval of the naming capability the user moves to a checkout cart screen to purchase their product. Once the order and purchase of a color product is initiated by a user, data is moved to various servers in support of the manufacturing system as described above. At this stage, the central cloud or premise order Server 370 records the order for the user and sets time line for delivery of the finished color product to the user according to the user color product specifications.

Figure 5:
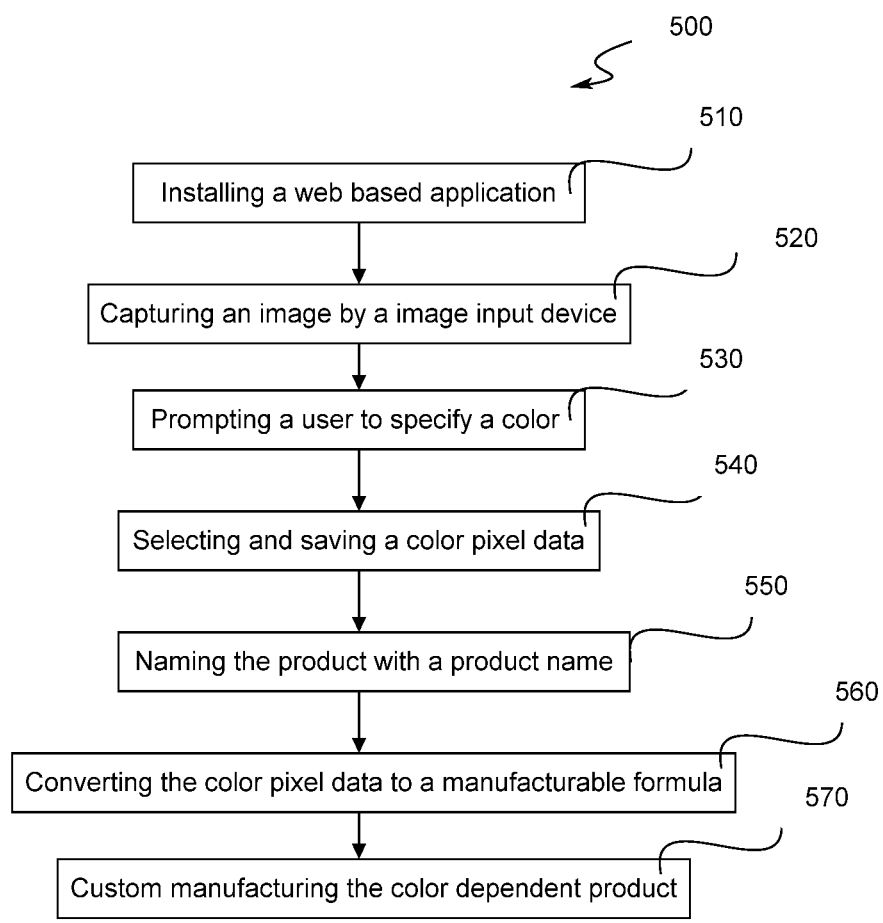
FIG. 5 illustrates a flow chart for manufacturing color dependent products.

Referring to FIG. 5, FIG. 5 illustrates a sample flow diagram 500 for a method of manufacturing one or more color dependent products. At step 510 the user may download and install a web-based application 310 on device 320. In other embodiments, the application may be a local application that does not require any Internet interaction. In step 510, a server computer may receive device identification information from regarding device 310. Additionally, at step 510 the server computer may download device related color and pixel modification information from a database or device manufacturer resource.

In some embodiments, at step 520, the device 320 may capture an image from an image input device (e.g., camera, CMOS based camera, one or more cameras). Prior to step 520, the user may have captured in image or the user may open the downloaded application from step 510 to capture the image. At step 520, capturing an image includes using an electronic circuit to gather color information and storing the color information in the memory of the device 310 or storing the image in a cloud based storage repository.

In various embodiments, at step 530, the device 320 with the downloaded application may prompt the user to select a color for the production of the color dependent. The device 310 is configured to receiver user input by various methods, including touch, stylus, keyboard or mouse. In some embodiment, the user may magnify a portion of the image and use touch input to select one or more pixels on the screen. The application allows the user to isolate a particular area of the image. The color chosen is a made up of a single pixel that is converted into a side to side color swatch, giving the user a scaled method in which to choose and approve a color.

Next at step 540, the pixel data is received by the downloaded application on the device 310, in RGB format (0-255, 0-255, 0-255). In some embodiments, the pixel data is processed by a remotely located server computer and then stored in RGB format on the device 310.

Next at step 550, the color dependent product is named with a product name by a digital tool. In a preferred embodiment, the digital tool offers the user to chosen from a list of favorite names or create a new customer and unique name for the color product which is converted to a barcode or unique label for conveying specific product information to the manufacturing facility through the central cloud order server 470.

Next at step 560, the color pixel data is converted to a manufactural formula for the color dependent product and the information is conveyed to the manufacturing facility, as to the mixing proportions of basic color materials for attaining the user generated unique color specification.

Finally, at step 570, the central cloud order server 470 communicates to the manufacturing facility with the user specification for one or more color products with their unique bar codes and the color dependent product is manufactured by a custom process.

Figure 6:
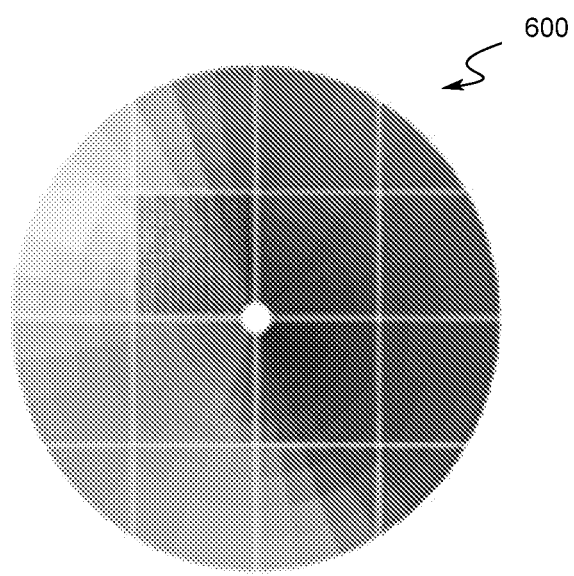
FIG. 6 illustrates an example digital color spectrum.

Referring to FIG. 6, FIG. 6 illustrates a digital color spectrum 600. The ability to convert digital color data to a mixable, manufacturable formula, uses a math structure that has created a large sample set of mix formulas database based on a RGB color model that have a unique and consistent positioning within the entire digital color spectrum, which is supported by a standard in the mobile and smart phone, mobile device, computer and image capture industry. A RGB color model is an additive color model in which red, green and blue light are added together in various ways to reproduce a broad array of colors. The name of the model comes from the initials of the three additive primary colors, red, green and blue. The main purpose of the RGB color model is for the sensing, representation and display of images in electronic devices and systems. As the RGB color model is based on human perception of colors, it is a device-dependent color model: different devices detect or reproduce a given RGB value differently, since the color elements (such as phosphors or dyes) and their response to the individual R, G and B levels vary from manufacturer to manufacturer, or even in the same device over time. Thus, a precise color management is a necessary step to make sure the RGB value define the same color across devices.

Figure 7:
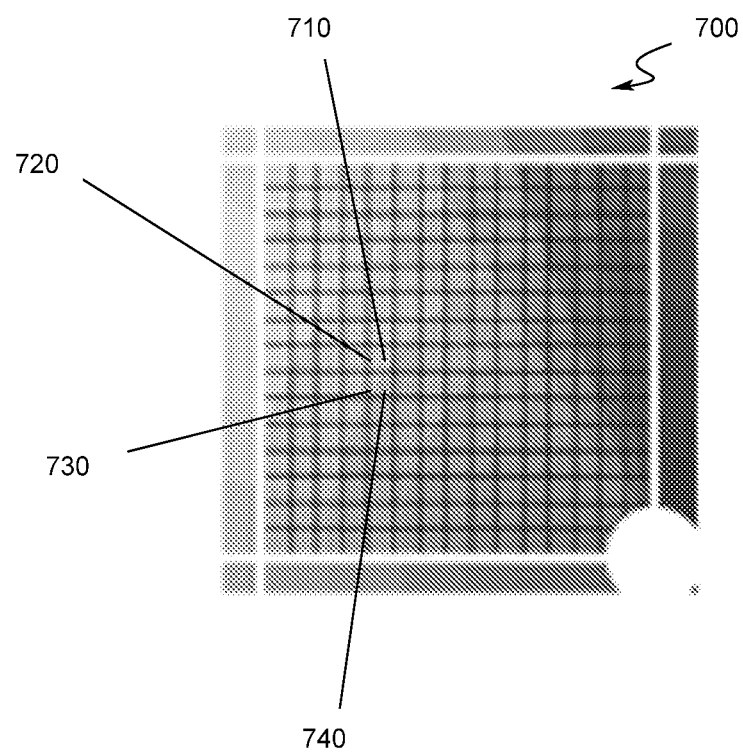
FIG. 7 illustrates an enlarged view of a portion of the digital color spectrum.

Referring to FIG. 7, FIG. 7 illustrates an enlarged view 700 of a portion of the digital color spectrum. A unique color specified by a user for a color product manufacturing is mapped on to a preexisting database of mix formulas to arrive at a specific mix formula of the RGB colors to attain the user desired color specification. A method to measure the distance between points of color in the color spectrum, with a complimentary and aligned set of formulas that are represented on that same position in the color spectrum is described. A mathematical method can connect the color data points and their respective formulas that are connected to a point of color in the color spectrum, which exist between two, three and four points of color that have known formulas represented on that same position in the color spectrum. For example, if a shade of greenish yellow is chosen by a user as a user desired color for manufacturing by the method a described above as illustrated in FIG. 7, a mix formula can be achieved by manipulating the known mix formula for the points 710, 720, 730 and 740 circumferencing the user desired color shade of greenish yellow as shown in FIG. 7.

| S. N | Color data point | RGB Color Data Point | Known Mix formula |
|---|---|---|---|
| 1. | 710 | (x1, y1, z1) | (M11, M12, M13) |
| 2. | 720 | (x2, y2, z2) | (M21, M22, M23) |
| 3. | 730 | (x3, y3, z3) | (M31, M32, M33) |
| 4. | 740 | (x4, y4, z4) | (M41, M42, M43) |

By varying the RGB color proportions for the known mix formulas based on hue, saturation and intensity relationship described below, the mix formula for the user desired color can be achieved to match accurately to the user desired color specification.

$$I = \frac{R + G + B}{3}$$

$$S = 1 - \frac{3}{(R + G + B)} \min(R, G, B)$$

$$H = \cos^{-1}\left(\frac{\frac{1}{2}((R - G) + (R - B))}{(R - G)^2 + (R - B)(G - B)}\right)^{\frac{1}{2}}$$

This analysis of color data that is user chosen and generated in the digital application and web segment of the invention, and the ability to take any point of color in the spectrum and convert that color to a mixable and manufacturable formula is part of the system and invention.

Methods for color comparison at the color product verification subsystem may include but not limited to polar comparison, Percentage comparison and regression analysis: In case of polar comparison with polar coordinates, a pixel's location is given by magnitude and angle. The color image shows pixel magnitude (or image A or image B intensity) as intensity. Polar angle is shown as hue. With positive valued images, pixel angle is between 0 and 90 degrees. Pixel angles are mapped to any continuous swatch of a color wheel where R=0, G=120, B=240 degrees. In case of percentage comparison: p=100*(B intensity)/(A intensity+B intensity) may be used to specify hue. With polar and percentage comparisons methods the mapping is isomorphic, all information in the two gray scale images is retained in the color image. Color Comparison also generates a histogram of pixel pair angles (0 to degrees) or percentages (0 to 100%) sorted into a user specified number of bins. In case of a linear regression and standard error of regression are calculated predicting Finished color product color and the initial user specified color by comparing their pixel intensities. The hue of each pixel in the color image expresses the residual, the difference between the finished product color and initial user specified color intensity divided by the standard error of regression gives a quality check for accuracy of the finished product in comparison to the user specified color. Based on the deviation from the user's original specification a finished product is accepted or rejected in a quality assurance analysis.

In an exemplary embodiment, below is described an ability to design and name a user's nail polish of the present invention but are by no means intended to limit the scope thereof. A user who has registered and downloaded the hybrid application and installed that application on their mobile devise, in this example an iPhone, opens the application and is presented with three choice; to initiate a new order, to order colors that others have defined and trendy or order a color from a previous order. Example: user chooses to initiate a new order and is presented with an image capture or camera application that the system application has opened. The user takes a picture and accepts that image. The image does not have to be in focus, because the application uses color only for ordering purposes. The user is presented with their chosen image and that image can be stretched or zoomed to further define the area of the image that contains the desired color.

The user taps their finger or by using a digital pencil a color pixel is chosen and presented as a possible color. If the user would like to specify a different color they are returned to the image, if the initial color is acceptable, the user is presented on a different screen the target color and two other colors that the system has chosen that are a) a bit subtle and b) a bit more intense. This is done do to the variables between different phones, tablets, or other devices used which could be attributed to age, software version and dirt on the lens, there are also variances due to ambient light and general quality of the captured or used image. The user can either pick one of the three images or can return to the camera/image capture section of the application to begin the process again.

The next section of the application is naming section. A bottle of the product is presented that shows an example of the chosen color and the ability to customize the name of that product. If the user clicks on the "customize name" portion of the bottle a keyboard is presented and the user can type a name or use symbols included in the keyboard set to personalize their polish. As the user is typing, they see each letter or symbol presented on the bottle in the same area of the label as the actual product. They system includes a "foul language" dictionary—any word that considered to be foul or offensive, various letters are removed and replaced with symbols to further add to product customization. When completed the user accepts and moves to the order section of the application.

The user completes the appropriate and required information and the order is submitted for approval to a third party transactional verification system. Upon approval data from the order is sent to system servers for color data formula conversion and order activation.

The color server accepts and converts color data provided by the user and based upon the color data associated with the system developed palette of colors and the formula structure developed in the system, the color data provided by the user is converted to a manufacturing formula and sent to system servers to be integrated into the user's order stored into the systems active order server.

Some data included in the complete user's order is converted to machine language and pulled by the software control application included in the equipment platform. The "pull" is initiated by the scan of the variable and unique barcode printed on the label at the beginning of the equipment line.

The order is fulfilled based on the user's unique order information, staged for delivery and delivered to the user.

In another exemplary embodiment, below is described an ability to specify a paint color on your mobile phone, order that paint and pick up that paint at a participating retailer or facility within the hour. A user who has registered and downloaded the hybrid application and installed that application on their mobile devise, in this example an iPhone, opens the application and is presented with three choice; to initiate a new order, to order colors that others have defined and trendy or order a color from a previous order. Example: user chooses to initiate a new order and is presented with an image capture or camera application that the system application has opened. The user takes a picture and accepts that image. The image does not have to be in focus, because the application uses color only for ordering purposes. The user is presented with their chosen image and that image can be stretched or zoomed to further define the area of the image that contains the desired color.

The user taps their finger or by using a digital pencil a color pixel is chosen and presented as a possible color. If the user would like to specify a different color they are returned to the image, if the initial color is acceptable, the user is presented on a different screen the target color and two other colors that the system has chosen that are a) subtler and b) more intense. This is done do to the variables between different phones, tablets, or other devices used which could be attributed to age, software version and dirt on the lens, there are also variances due to ambient light and general quality of the captured or used image.

The user can either pick one of the three images or can return to the camera/image capture section of the application to begin the process again.

The user in this example approves and picks a color and completes their order with the retailer of choice. The order is paid for by way of a transactional interface included in the application and managed by the retailer. The specified color is sent to the system color data conversion server where the color data is converted to a mix formula based on the palette of colors included in the retailer's equipment platform, the volume of paint to be manufactured.

The formula is sent to a specific retailer location by electronic means and is integrated into the retailer's POS system and the facility based paint dispersion equipment platform by way of an API.

The paint is manufactured to specification and a completion text or email is sent to the user. The completion text or email includes a pick-up time and other pertinent information supplied by the retailer. The user visits the retail location and picks up their order.

The numerous advantages offered by the above described invention over prior systems are (i) System integrated custom labeling equipment that takes user generated naming or symbol based language and prints that information on a label that has been pre-printed with branding, product volume and general required product specific information. (ii) A circular and/or liner conveyor module that moves bottles, containers and other types of packaging forward along the material dispersion cycle. The cycle moves bottles, containers and other types of packaging into fixed positions so that individually colored product can be dispensed into those bottles, containers and other types of packaging. (iii) A series of individual cassettes that contain individual material colors to be dispensed as part of a unique user generated color formula. Each cassette is connected to an individual peristaltic, piston, gear, time/pressure, pipette or other type pump to dispense or disperse micro or Pico liters of material through a micro dispensing actuator. (iv) A digital camera or image capture device used to analyze the color of the finished product whereas that captured color is converted into digital data and compared to the original color data captured by the user and to the color data associated with the unique order based formula, and further analyzed for quality purposes using a system specific algorithm developed to compare digital color data within acceptable product quality tolerances and ranges. (v) A separating conveyor to separate orders by type, size and as well as the user defined, custom name or naming language or system generated tracking number that is included with the archival data associated with the order. The completed bottle of nail polish, coating or paint or other product is then placed into packaging and shipped to an individual, group or location. (vi) The personalized manufacturing system can color mix from an individual's personalized nail polish, coatings or paint to an extremely accurate specification with specific color materials optimized for the system that have been formulated to minimize variances in viscosity, color density, flow and product performance.

The invention can provide a personal, on-demand, customer experience for the purchase of micro batched produced products namely nail polish, paints, coatings, cosmetics and other products where color is a key specification component. Deliver customized and personalized high quality products to customers (consumers, nail solon, retailers, others) in 72 hours at a competitive and cost effective price.

In a preferred embodiment, for nail enamel based color products, cosmetic-grade pure pigments and shimmering effects can be blended into the nail enamel for a custom finish. Also, fluorescent additives can be blended together to create a rainbow of colors, and the additive effects give different levels of shimmer and sparkle to choose from. User can select pure pigment colors in different hues to produce various pigment effects to re-create designer nail fashions or play with additives to make user's own signature hues.

In another preferred embodiment, for paints and varnish based color products, a user can select the ingredients for a final product curing by thermosetting or thermoplastic mechanisms. Also pigments, fillers and additives, can be introduced in the manufacturing process to modify surface tension, improve flow properties, improve the finished appearance, increase wet edge, improve pigment stability, impart antifreeze properties, control foaming, control skinning, etc. Other types of additives include catalysts, thickeners, stabilizers, emulsifiers, texturizers, adhesion promoters, UV stabilizers, flatteners (de-glossing agents), biocides to fight bacterial growth, and the like. These additives normally do not significantly alter the percentages of individual components in a formulation. Various technologies exist for making paints that change color. Thermochromic paints and coatings contain materials that change conformation when heat is applied or removed, and so they change color. Color-changing paints can also be made by adding halochrome additives or other organic pigments in the above described manufacturing process. Electrochromic paints change color in response to an applied electric current. Electrochromic paints can be applied to plastic substrates as well, using a different coating chemistry. The technology involves using special dye additives that change conformation when an electric current is applied across the film itself.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system, or a printer circuit board. Embodiments within the scope of the present disclosure include program products comprising machine readable media for carrying or having machine-executable instructions or data structures stored thereon. Such machine-readable media can be any available media that can be accessed by a general purpose or special purpose computer or another machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or another machine with a processor. When information is transferred, or provided over a network or another communications connection (either hardwired, wireless, or a combination of hardwired or wireless) to a machine, the machine properly views the connection as a machine-readable medium. Thus, any such connection is properly termed a machine readable medium. Combinations of the above are also included within the scope of machine-readable media. Machine-executable instructions include, for example, instructions and data which cause a general-purpose computer, special purpose computer, or special purpose processing machines to perform a certain function or group of functions.

Although the figures may show a specific order of method steps, the order of the steps may differ from what is depicted. Also, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

The invention claimed is:

1. A method for manufacturing color dependent products, the method comprising:
   capturing an image by a camera device on an electronic device;
   displaying the image on a display of the electronic device;
   receiving a selection, from a user, of an area of the image that is being displayed on the electronic device;
   determining a color pixel data, based on the area, to be later manufactured into a color product;
   generating an image of a manufactured color product based on the color pixel data;
   displaying the image of the manufactured color product on the display of the electronic device;
   converting, by a processor, the color pixel data to a manufacturable formula for the color product; and
   custom manufacturing the color product based on the manufacturable formula; and
   wherein a color of the color product is adjusted based on a comparison of colors of a finished color product in wet, dry, and cured states.

2. The method as described in claim 1, further comprising distributing and storing of customer data, the manufacturable formula and order data for active and archival use.

3. The method as described in claim 1, further comprising communicating acknowledgement, acceptance or denial of an order to a customer through the electronic device.

4. The method as described in claim 1, further comprising accepting user information including credit card information through secure means to process a payment for the custom manufacturing.

5. The method as described in claim 1, further comprising sending of responsive text messages and email messages to the electronic device that contain a status of the custom manufacturing to customers.

6. The method as described in claim 1, further comprising displaying one or more additional selectable colors, based on one or more elements that affect a quality of the capturing of the image, that are adjustable by the user.

7. The method of claim 6, wherein the one or more elements comprise ambient light at a time of the capturing of the image.

8. The method of claim 1, further comprising naming the color product with a product name by a digital tool; and
   wherein naming further comprises creating a unique label, based on the color pixel data, for conveying product information to a manufacturing facility.

9. The method of claim 1, further comprising approving the color product based on a comparison of the color of the finished color product to the color pixel data.

10. The method of claim 1, further comprising:
    receiving a selection of an additive from the user; and
    integrating the additive into the manufacturable formula.

11. The method of claim 10, wherein the additive comprises at least one of: a cosmetic-grade pure pigment, a shimmering effect, and a fluorescent additive.

12. The method of claim 10, wherein the additive comprises at least one of: a catalyst, a thickener, a stabilizer, an emulsifier, a texturizer, an adhesion promoter, a UV stabilizer, a flattener, and a biocide.

13. The method of claim 10, wherein the additive causes the color product to change color in responsive to environmental stimuli; and
wherein the additive is at least one of: a thermochromic paint or an electrochromic paint.

14. The method of claim 1, further comprising transmitting the color pixel data to a server.

15. The method of claim 14, further comprising transmitting, by the server, the color pixel data to be displayed on one or more electronic devices.

16. A system for manufacturing a color dependent product, the system comprising:
an application on an electronic device configured to cause the electronic device to:
capture an image by a camera on the electronic device;
display the image on a display of the electronic device;
receive a selection, from a user, of an area of the image that is being displayed on the electronic device;
determine a color pixel data, based on the area, to be later manufactured into a color product;
generate an image of a manufactured color product based on the color pixel data;
display the image of the manufactured color product on the display on the electronic device; and
convert, by a processor, the color pixel data to a manufacturable formula for the color product;
a tool to custom manufacture the color product based on the manufacturable formula; and
an image capture device that is configured to:
compare color variations of a finished color product in wet, dry, and cured states with the color pixel data; and
approve the finished color product based on the comparison.

17. The system of claim 16, the application on the electronic device further configured to transmit the color pixel data to a server.

18. The system of claim 17, wherein the server is configured to transmit the color pixel data to a display of one or more electronic devices.

19. A method for manufacturing color dependent products, the method comprising:
capturing an image by a camera device on an electronic device;
displaying the image on a display of the electronic device;
receiving a selection, from a user, of an area of the image that is being displayed on the electronic device;
determining a color pixel data, based on the area, to be later manufactured into a color product;
generating an image of a manufactured color product based on the color pixel data;
displaying the image of the manufactured color product on the display of the electronic device;
converting, by a processor, the color pixel data to a manufacturable formula for the color product;
custom manufacturing the color product based on the manufacturable formula;
receiving a selection of an additive from the user; and
integrating the additive into the manufacturable formula;
wherein the additive causes the color product to change color in responsive to environmental stimuli; and
wherein the additive is at least one of: a thermochromic paint or an electrochromic paint.

* * * * *